(12) United States Patent
Ha et al.

(10) Patent No.: US 9,067,318 B2
(45) Date of Patent: Jun. 30, 2015

(54) METHOD FOR ESTIMATING CONNECTION ORDERS OF MODULES OF MODULAR ROBOT

(75) Inventors: Tae Sin Ha, Seongnam-si (KR); Kyung Shik Roh, Seongnam-si (KR); Dong Min Shin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 846 days.

(21) Appl. No.: 13/280,591

(22) Filed: Oct. 25, 2011

(65) Prior Publication Data

US 2012/0150348 A1 Jun. 14, 2012

(30) Foreign Application Priority Data

Dec. 13, 2010 (KR) .................. 10-2010-0126852

(51) Int. Cl.
*G05B 15/00* (2006.01)
*B25J 9/16* (2006.01)

(52) U.S. Cl.
CPC ..... *B25J 9/1605* (2013.01); *G05B 2219/40525* (2013.01)

(58) Field of Classification Search
USPC .................. 700/245, 260, 261, 258; 318/432, 318/568.2; 901/6, 15, 28
See application file for complete search history.

(56) References Cited

U.S. PATENT DOCUMENTS 5,523,662 A * 6/1996 Goldenberg et al. .... 318/568.11
2012/0123441 A1* 5/2012 Au et al. ....................... 606/130

* cited by examiner

*Primary Examiner* — Thomas G Black
*Assistant Examiner* — Peter D Nolan
(74) *Attorney, Agent, or Firm* — Harness, Dickey & Pierce, P.L.C.

(57) ABSTRACT

A method for estimating a connection order of modules in a robot including the modules each having a joint as a basic unit. Since a device and a program are connected by software and thus a joint and program are connected by software, it is possible for a user to control robot joints without being aware of the connection relationship between the devices and the joints in the modular robot in which the plurality of modules each including a movable joint as a basic unit is connected.

17 Claims, 5 Drawing Sheets

METHOD FOR ESTIMATING CONNECTION ORDERS OF MODULES OF MODULAR ROBOT

CROSS-REFERENCE TO RELATED APPLICATIONS

This application claims the benefit of Korean Patent Application No. 2010-126852, filed on Dec. 13, 2010 in the Korean Intellectual Property Office, the disclosure of which is incorporated herein by reference.

BACKGROUND

1. Field

Embodiments relate to a method for estimating a connection order of modules in a robot including the modules each having a joint as a basic unit.

2. Description of the Related Art

In general, a mechanical device which performs motion similar to that of a human using an electrical or magnetic mechanism is called a robot. Recently, with advances in sensor and controller technology, the robot has been utilized in various fields. For example, there are a household robot, a guide robot of a public place, a transportation robot of a manufacturing plant and an operator assisting robot. Such a robot performs an operation using a manipulator which moves similar to an operation of a human arm or hand by an electrical/mechanical mechanism.

Most manipulators which are currently being used are configured by connecting several links. A connection between links is referred to as a joint and the joint includes a motor to drive the joint.

In the case of a link robot, a robot (hereinafter, referred to as a modular robot), the structure of which is appropriately changed or reconfigured by connecting modules each having a movable joint as a basic unit according to necessary functions, has been developed.

A modular robot may be reconfigured in a variety of ways. Since parts may be freely replaced, convenience and usability are increased. In such a modular robot, since a device and a joint are connected by hardware and a device and a program are connected by software, a degree of freedom of the connection is secured using a method of assigning a unique ID to each device and storing a connection relationship between joints and devices. However, in such a method, different IDs are assigned to all devices and firmware varies according to devices. When a problem occurs, it is necessary to reconstruct the firmware in order to replace the firmware between devices. If a user is not aware of a connection relationship between joints and devices, a robot joint may not be controlled.

SUMMARY

Therefore, it is an aspect of an embodiment to provide a method for estimating a connection order of modules in a modular robot including a plurality of modules each including a movable joint as a basic unit, which is able to control the joint without being aware of a connection relationship between joints and devices by connecting a joint and a program by software.

Additional aspects of embodiments will be set forth in part in the description which follows and, in part, will be obvious from the description, or may be learned by practice of the embodiments.

In accordance with an aspect of an embodiment, there is provided a method for estimating a connection order of modules of a modular robot in which a plurality of modules each including a joint, a link connected to the joint and a device for controlling the joint is connected, including sequentially moving the joints respectively provided in the plurality of modules, measuring torques applied to the plurality of joints while the plurality of joints sequentially moves, arranging indexes of the devices according to the measured joint torques, and comparing the arranged device indexes so as to estimate the connection order of the plurality of modules.

The sequentially moving of the plurality of joints may include selectively moving one of the plurality of joints, and enabling the joints other than the moving joint to remain stationary.

The measuring of the joint torques may include sequentially measuring the torques applied to the joints other than the moving joint when the plurality of joints sequentially moves.

The arranging of the indexes of the devices may include arranging the indexes of the devices from the moving joint in descending order of the joint torques measured whenever the plurality of joints sequentially moves.

The indexes of the devices are arranged from the moving joint by the number of joints.

The estimating of the connection order of the plurality of modules may include selecting one of the device indexes arranged by the number of joints, next arranging a device index closest to the selected device index, and repeating the selection and the arrangement with respect to the plurality of device indexes so as to estimate the order of the plurality of joints.

In accordance with another aspect of an embodiment, there is provided a method for estimating a connection order of modules of a modular robot in which a plurality of modules each including a joint, a link connected to the joint and a device for controlling the joint is connected, including measuring current positions of the joints respectively provided in the plurality of modules and setting the measured positions as reference positions, measuring position variations of an end-effector while sequentially moving the plurality of joints, arranging device indexes in order of measured position variations, and estimating the connection order of the plurality of modules according to the arranged device indexes.

The method may further include performing a first operation to turn off the plurality of joints, a second operation to control the plurality of joints such that the distance between the links provided in the plurality of modules is maximized and a third operation to enable the plurality of joints to remain stationary, and the first to third operations may be performed before the positions of the plurality of joints are measured.

The measuring of the position variations may include selecting and moving one of the plurality of joints, and measuring the position variation of the end-effector when the selected joint moves.

The arranging of the device indexes may include measuring the position variations of the end-effector while moving the plurality of joints by the same displacement and arranging the device indexes in order of the measured position variations.

The method may further include determining that a joint in which the position variation of the end-effector is largest is connected to a base.

In accordance with another aspect of an embodiment, there is provided method for estimating a connection order of modules of a modular robot in which a plurality of modules each including a joint, a link connected to the joint and a device for controlling the joint is connected, including measuring acceleration variations of the devices respectively provided in the plurality of modules while sequentially moving the joints respectively provided in the plurality of modules, arranging device indexes in the order of measured acceleration variations, and estimating the connection order of modules according to the arranged device indexes.

The sequentially moving of the plurality of joints may include selecting and moving one of the plurality of joints, and enabling joints other than the moving joint to remain stationary.

The measuring of the acceleration variations may include selecting and moving one of the plurality of joints, and measuring the acceleration variations of the plurality of devices which varies when one joint moves.

The arranging of the device indexes may include measuring the acceleration variations of the plurality of devices while the plurality of joints moves by the same displacement and arranging the device indexes in the order of measured acceleration variations.

The method may further include determining that a joint having a largest acceleration variation is connected to a base.

In accordance with another aspect of an embodiment, there is provided a method for estimating a connection order of modules of a modular robot in which a plurality of modules each including a joint, a link connected to the joint and a device for controlling the joint is connected, including measuring torques applied to the plurality of joints while sequentially moving the joints respectively provided in the plurality of modules and primarily estimating the connection order of modules, measuring pose variations of end-effectors while sequentially moving the plurality of joints and secondarily estimating the connection order of modules, measuring acceleration variations of the devices respectively provided in the plurality of modules while sequentially moving the plurality of joints and thirdly estimating the connection order of modules, computing relative distances between the plurality of joints using the primarily to thirdly estimated connection order of modules, and averaging the computed relative distances between the plurality of joints and rearranging the connection order of modules.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
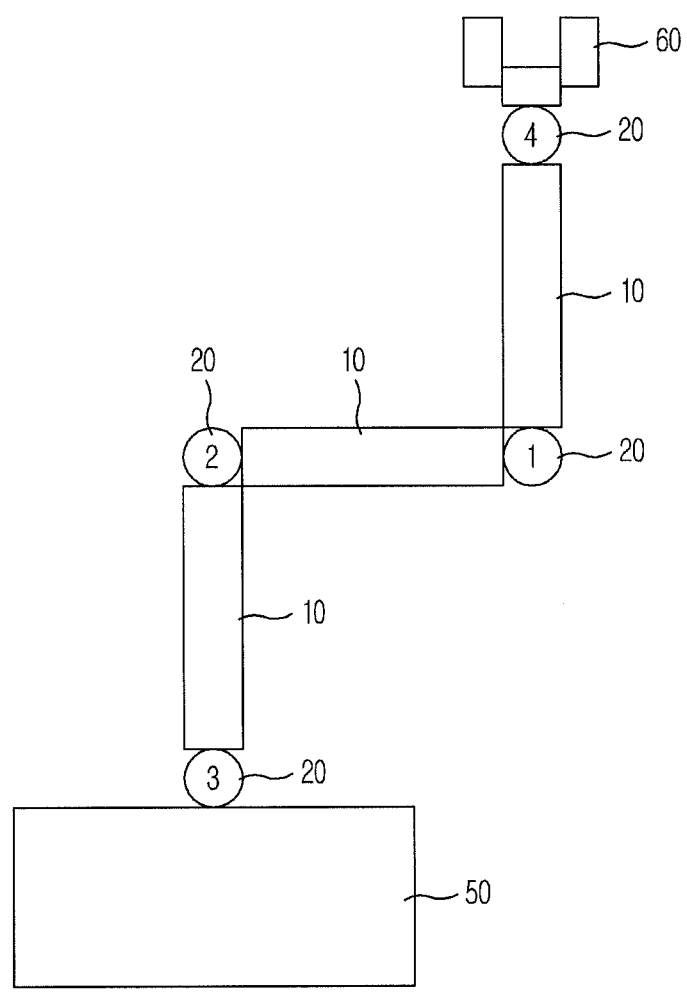
FIG. 1 is a schematic diagram showing an example of a modular robot according to an embodiment.

Reference will now be made in detail to embodiments, examples of which are illustrated in the accompanying drawings, wherein like reference numerals refer to like elements throughout.

FIG. 1 is a schematic diagram showing an example of a modular robot according to an embodiment.

In FIG. 1, the modular robot 100 according to an embodiment is a manipulator to move an object in a three-dimensional space and perform a necessary operation and includes a plurality of links 10 which are sequentially connected.

In the modular robot 100, two links 10 are connected through a joint 20, one link 10 is connected to another link 10 by one or two joints 20.

The link 10 having only one joint 20 includes a base 50 and an end-effector 60.

The base 50 is a link to fix and support the modular robot 100 and is generally fixed to a world (environment). The end-effector 60 is a link fixed to a tool so as to perform an actual function.

Figure 2:
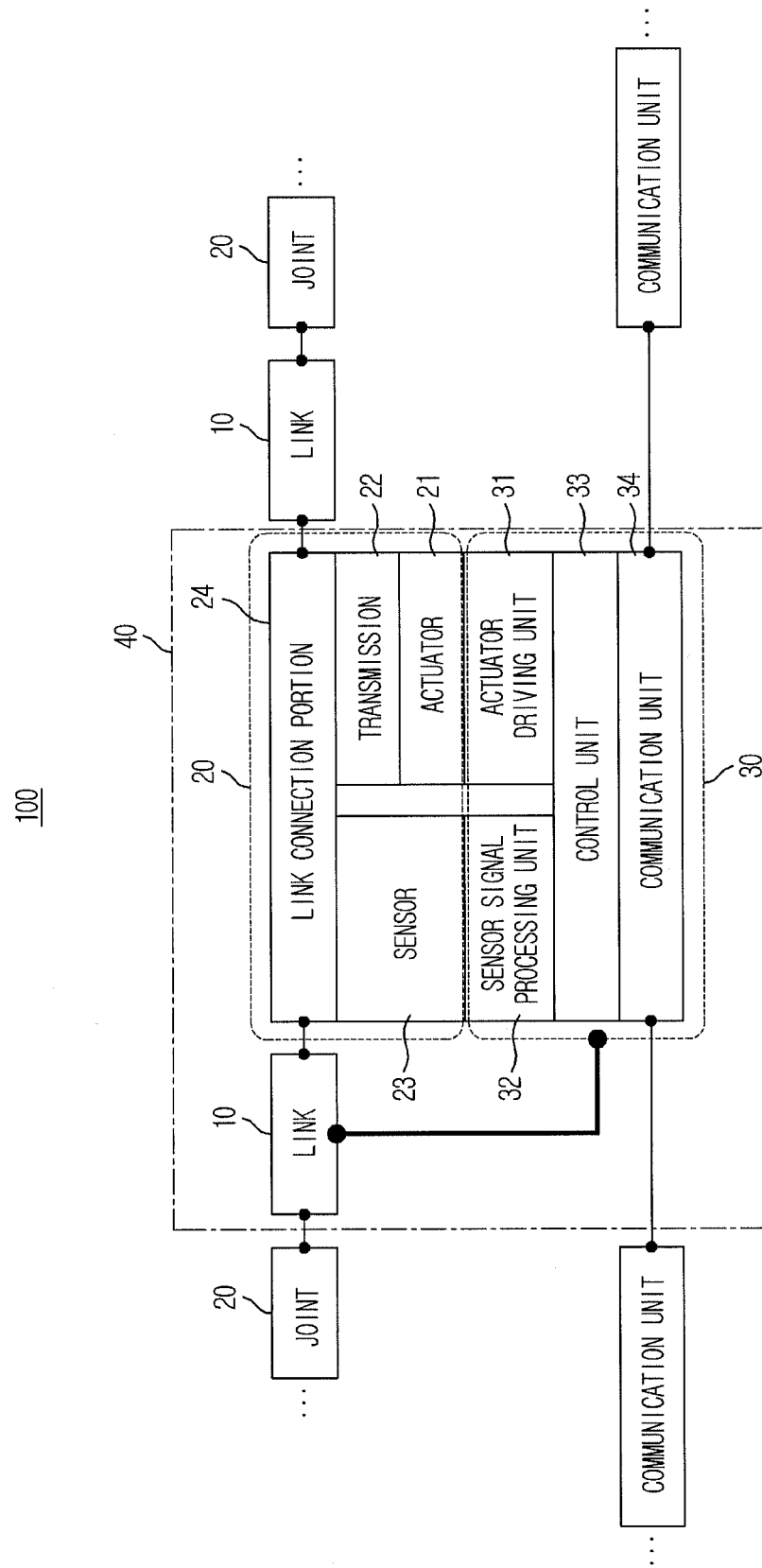
FIG. 2 is a diagram showing the configuration of a modular robot according to an embodiment.

FIG. 2 is a diagram showing the configuration of a modular robot according to an embodiment.

In FIG. 2, the modular robot 100 according to an embodiment has a structure in which a plurality of modules 40 each including a movable joint 20 as a basic unit are connected.

The module 40 includes a link 10, a joint 20 and a device 30.

The link 10 is a rigid body forming the structure of the modular robot 100 and having the device 30 fixed thereto.

The joint 20, the position of which varies by driving an actuator 21, includes the actuator 21, a transmission 22, a sensor 23 and a link connection portion 24.

The actuator 21 is a power generator such as a motor, an air cylinder, or an artificial muscle.

The transmission 22 is a power delivery device such as a gear, a belt-pulley or a ball-screw.

The sensor 23 includes an incremental encoder or an absolute encoder to measure a rotation angle/speed, a torque sensor or a force/torque sensor to measure torque, a current sensor to measure current, a displacement sensor to measure position variation, and an acceleration sensor to measure straight-line acceleration variation.

The link connection portion 24 is a device to connect two links 10 and assist the operation of the actuator 21.

The device 30 drives the sensor 23 and processes and delivers a sensor signal. The device 30 drives and controls the actuator 21 based on the sensor signal according to a programmed control algorithm and includes an actuator driving unit 31, a sensor signal processing unit 32, a control unit 33 and a communication unit 34.

The actuator driving unit 31 serves to drive the motor according to a control signal.

The sensor signal processing unit 32 serves to drive the sensor 23 and process the measured sensor signal such that the sensor signal is available.

The control unit 33 serves to control the motor based on the sensor signal according to the programmed control algorithm.

The communication unit 34 serves to share data with another device 30 and perform communication (exchange).

Hereinafter, the operation and effect of the method for estimating a connection order of modules of the modular robot having the above-described configuration will be described.

Figure 3:
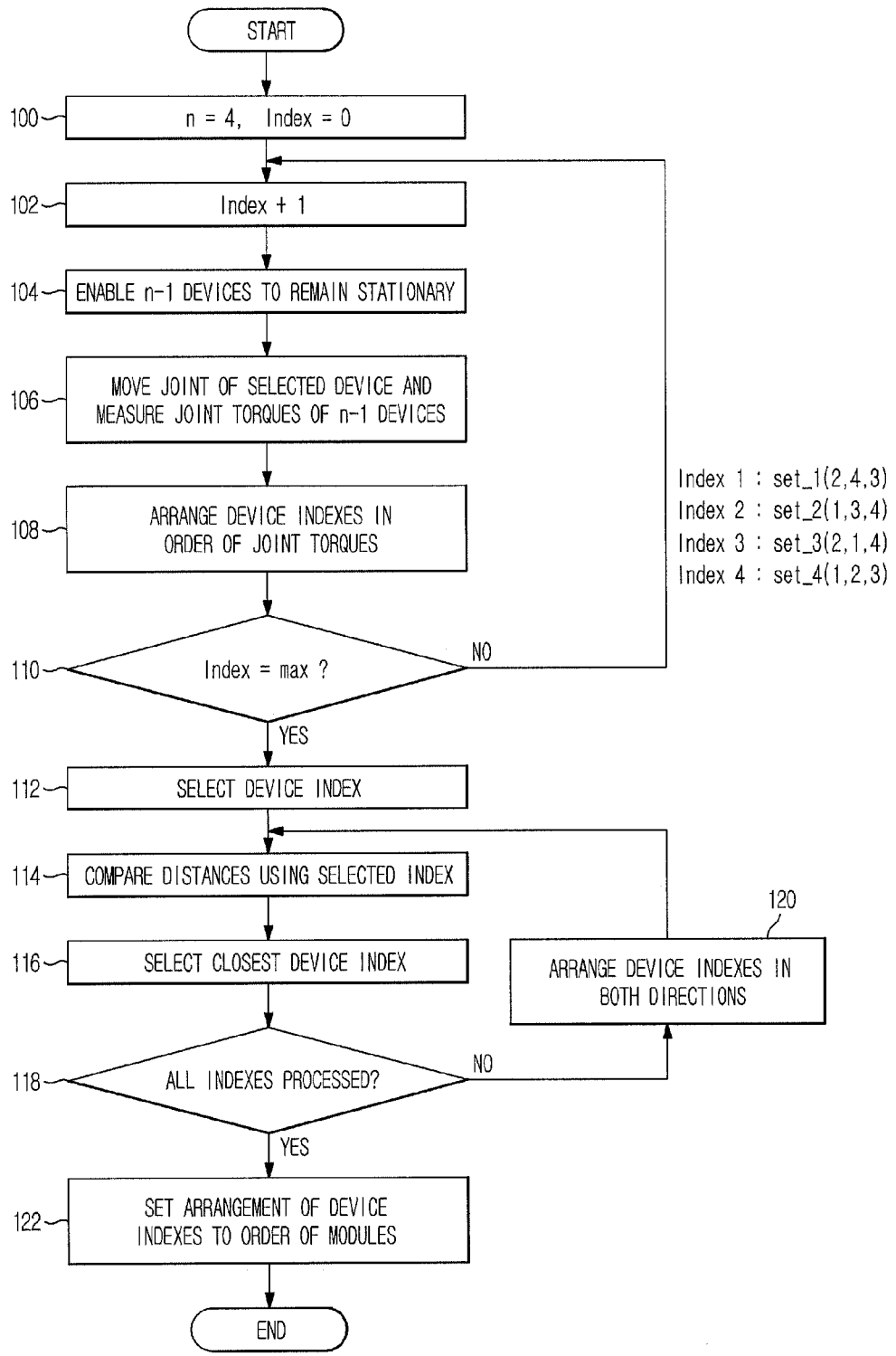
FIG. 3 is a flowchart illustrating a method for estimating a connection order of modules based on joint torques in a modular robot according to an embodiment.

FIG. 3 is a flowchart illustrating a method for estimating a connection order of modules based on joint torques in a modular robot according to an embodiment.

In FIG. 3, in the modular robot 100 in which the plurality of modules 40 are connected, if a joint 20 moves, force is applied to adjacent joints 20 by the motion of the joint 20. A joint which is closer to the moving joint 20 receives larger force. A method for measuring torques applied to the joints 20 based on such a principle and estimating the order of joints 20, that is, the connection order of modules 40 according to the measured torques, will be described.

In FIG. 3, it is assumed that the modular robot 100 may measure force/torque with respect to the joint 20 respectively provided in the plurality of modules 40 and may control all n (for example, 4) devices connected to n (for example, 4) joints 20 (100).

First, any one of the n (for example, 4) devices 30 is selected (102) and the joints 20 of the n−1 devices 30 other than the selected device 30 are controlled to remain stationary (104).

Subsequently, the selected device 30 is controlled to move the joint 20 thereof, and the torques of the joints 20 of the n−1 devices 30 other than the selected device 30 are measured (106).

The indexes of the devices 30 are arranged in descending order of the measured joint torques (108). The order indicates how close the joints are to the joint 20 of the selected device 30.

At this time, the above operations are repeated with respect to all the n (4) joints 20 and the indexes of the n (4) devices are arranged (110).

Subsequently, one of n (4) device indexes is selected (112) and a device index closest to the selected index is next arranged according to the order of device indexes obtained according to the torques of the joints 20 (114).

According to joint torques measured by performing an experiment with respect to the rearranged device indexes, a device index closest to the device index is next arranged (116). If the closest index is used in advance, a second closer device index is selected.

At this time, the device indexes may be arranged in a left direction or a right direction. The above operations are repeated in a direction, in which a distance between indexes is short, between the left direction and the right direction. For example, if a distance between the currently selected index and a device index closer thereto is greater than a distance between a leftmost device index and a device index closest thereto while the device indexes are arranged in the right direction, the device indexes are arranged in the left direction. The same is true in the opposite case. Accordingly, a device index closest to a leftmost or rightmost device index is added (120).

If the arrangement of the n (4) devices 30 is completed (118), the arrangement of the device indexes becomes the order of joints 20, that is, the connection order of modules 40 (122).

In the connection order of modules 40, the joint torques measured in the devices 30 located on both ends are compared, a joint 20 having large torque corresponds to the joint 20 connected to the base 50 and a joint 20 having small torque corresponds to the joint 20 connected to the end-effector 60.

Figure 4:
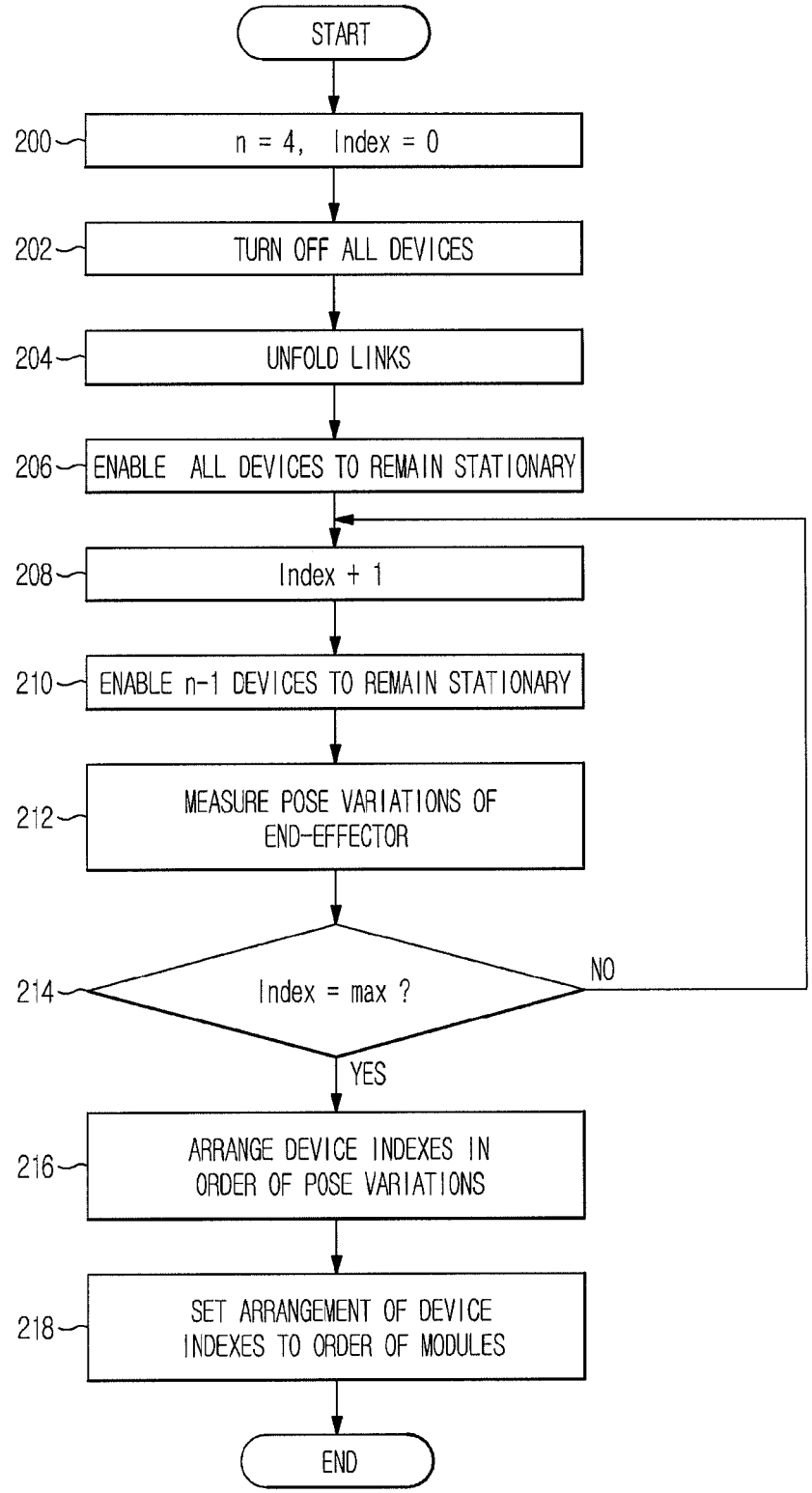
FIG. 4 is a flowchart illustrating a method for estimating a connection order of modules based on the position of an end-effector in a modular robot according to another embodiment.

FIG. 4 is a flowchart illustrating a method for estimating a connection order of modules based on the position of an end-effector in a modular robot according to another embodiment.

In FIG. 4, in the modular robot in which the plurality of modules 40 is connected, a pose variation is gradually increased from the base 50 to the end-effector 60. Based on this principle, a method of measuring the pose variations of the joints 20 and estimating the order of joints 20, that is, the connection order of the modules 40, according to the measured pose variations will be described.

In FIG. 4, the modular robot 100 may include a device to measure the pose of the end-effector 60 or measure the pose of the end-effector by attaching an Inertial Measurement Unit (IMU) to the end-effector 60. Alternatively, the pose of the end-effector may be measured by a vision or motion tracker. It is assumed that all n (for example, 4) devices 30 connected to n (for example, 4) joints 20 may be controlled (200).

First, the end-effector 60 is fixed to the device to measure the pose of the end-effector 60 or the IMU is attached to the end-effector 60 such that the pose of the end-effector 60 may be measured.

All the n (4) devices 30 are controlled such that the actuators 21 of the joints 20 are turned off and torques become 0 if joint friction compensation which is not based on the model of the modular robot 100 is possible.

Subsequently, the links 10 are unfolded by the user such that a distance between the base 50 and the end-effector 60 is maximized (204).

Then, all the devices 30 are controlled such that the joints 20 remains stationary, the current positions of the joints 20 are measured, and the measured positions are set as reference positions (206).

Next, any one of the n (for example, 4) devices 30 is selected (208), the n−1 devices other than the selected device 30 are controlled to remain stationary (210).

Subsequently, the selected device 30 is controlled to move the joint 20 thereof and the pose variation of the end-effector 60 is measured (212).

At this time, sensitivity of variation in structure of the modular robot 100 may be adjusted according to how to set the pose variation.

Subsequently, the above process is repeated while moving the n (for example, 4) devices 30 with the same displacement and the pose variation of the end-effector 60 is measured (214).

The pose variation of the end-effector is repeatedly measured with respect to the n (4) devices 30 and the device indexes are arranged in order of pose variations of the end-effector 60 (216). The order of device indexes arranged in this way becomes the order of joints 20, that is, the connection order of the modules 40 (218).

In the connection order of the modules 40, a joint 20 having a largest variation becomes a joint 20 connected to the base 50.

Figure 5:
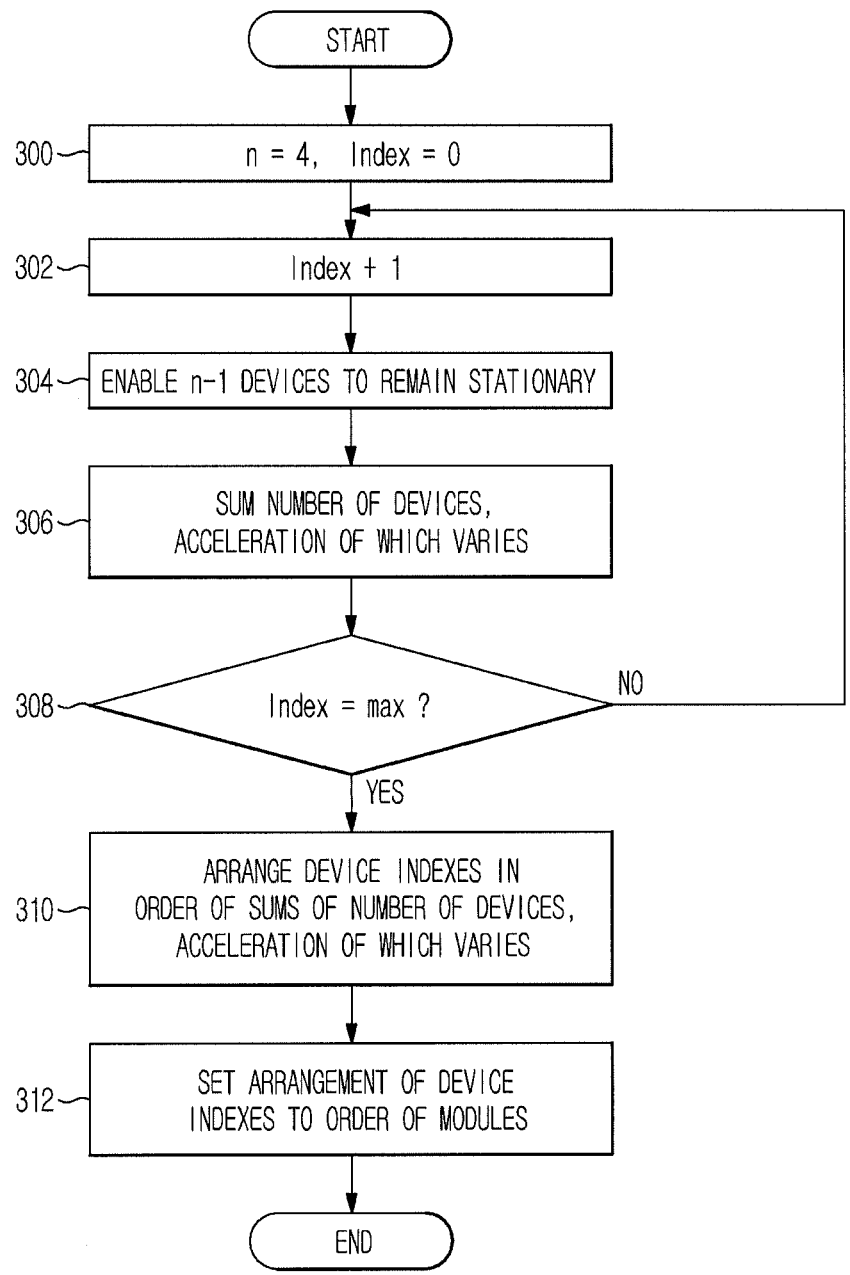
FIG. 5 is a flowchart illustrating a method for estimating a connection order of modules based on acceleration variations of devices in a modular robot according to another embodiment.

FIG. 5 is a flowchart illustrating a method for estimating a connection order of modules based on acceleration variations of devices in a modular robot according to another embodiment.

In FIG. 5, in the modular robot 100 in which the plurality of modules 40 is connected, motion of the device 30 varies according to motion of the joint 20 such that the acceleration sensor attached to the device 30 varies. The closer the device 30 is to the base 50, the number of devices, the acceleration of which varies by the motion of the joint 20, is increased. Based on this principle, a method of measuring acceleration variations of the devices 30 and estimating the order of joints 20, that is, the connection order of the modules 40, according to the measured acceleration variation will be described.

In FIG. 5, it is assumed that acceleration sensors are respectively attached to all devices 30 in the modular robot 100. A current humanoid robot includes acceleration sensors attached to all devices 30. It is assumed that all n (for example, 4) devices 30 connected to n (for example, 4) joints 20 may be controlled (300).

First, any one of the n (for example, 4) devices 30 is selected (302) and the n−1 devices 30 other than the selected device 30 are controlled such that the joints 20 thereof remain stationary (304).

Subsequently, the variations in acceleration sensors of all the devices 30 are measured while moving only the selected device 30 by a predetermined distance and a sum of the number of devices, the acceleration of which varies when the selected device 30 moves, is recorded (306).

The above process is repeated with respect to the n (4) devices 30 while moving the device by the predetermined distance and the acceleration variations of the devices 30 are measured (308).

The device indexes are arranged in descending order of the sum of the number of devices 30, the acceleration of which varies (310) and the order of device indexes arranged in this way becomes the order of joints 20, that is, the connection order of the modules 40 (312).

In the connection order of the modules 40, a joint 20 in which the sum of the number of devices 30 is largest is connected to the base 50.

Next, a method of rearranging the n modules 40 using the connection order of the three modules 30 estimated using the methods shown in FIGS. 3 to 5 will be described.

Relative distances between the device indexes are computed with respect to the connection order of the three modules 40 estimated using the method shown in FIGS. 3 to 5.

The relative distances of the device indexes obtained from the connection order of the three modules 40 is averaged.

Thereafter, the device indexes are rearranged according to the averaged relative distance.

In the modular robot 100 in which the plurality of modules 40 is connected, the user may control the joints 20 of the modular robot 100 without being aware of the connection relationship between the devices 30 and the joints 20.

According to the method for estimating the connection order of modules of the modular robot of an embodiment, since a device and a program are connected by software and thus a joint and program are connected by software, it is possible for a user to control robot joints without being aware of the connection relationship between the devices and the joints in the modular robot in which the plurality of modules each including a movable joint as a basic unit is connected.

Embodiments can be implemented in computing hardware and/or software, such as (in a non-limiting example) any computer that can store, retrieve, process and/or output data and/or communicate with other computers. For example, a computer may be used to perform various of the calculations and/or operations described in FIGS. 3, 4 and 5. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for estimating a connection order of modules of a modular robot, each module including a joint, a link connected to the joint and a device for controlling the joint, the method comprising:
   by one or more processing devices:
      sequentially moving the joints respectively provided in the modules;
      measuring torques applied to the joints while the joints sequentially move;
      arranging indexes of the devices according to the measured torques; and
      comparing the arranged indexes of the devices so as to estimate the connection order of the modules.

2. The method according to claim 1, wherein the sequentially moving includes:
   selectively moving one of the joints; and
   enabling the joints other than the moving joint to remain stationary.

3. The method according to claim 2, wherein the measuring torques includes sequentially measuring the torques applied to the joints other than the moving joint.

4. The method according to claim 3, wherein the arranging indexes includes arranging the indexes of the devices from the moving joint in descending order of the measured torques.

5. The method according to claim 4, wherein the indexes of the devices are arranged from the moving joint by the number of joints.

6. The method according to claim 5, wherein the comparing the arranged indexes of the devices so as to estimate the connection order of the modules includes:
   selecting one of the indexes of the devices arranged by the number of joints;
   next arranging an index of a device closest to the selected index; and
   repeating said selecting and said next arranging with respect to the indexes of the devices so as to estimate the order of the joints.

7. A method for estimating a connection order of modules of a modular robot, each module including a joint, a link connected to the joint and a device for controlling the joint, the method comprising:
   by one or more processing devices:
      measuring current positions of the joints respectively provided in the modules and setting the measured current positions as reference positions;
      measuring position variations of an end-effector of the modular robot while sequentially moving the joints;
      arranging indexes of the devices in order of measured position variations; and
      estimating the connection order of the modules according to the arranged indexes of the devices.

8. The method according to claim 7, further comprising:
   performing a first operation to turn off the joints, a second operation to control the joints such that the distance between the links provided in the modules is maximized and a third operation to enable the joints to remain stationary,
   wherein the first, second and third operations are performed before the current positions of the joints are measured.

9. The method according to claim 7, wherein the measuring of the position variations includes:
   selecting and moving one of the joints; and
   measuring the position variation of the end-effector when the selected joint moves.

10. The method according to claim 9, wherein the arranging of indexes of the devices includes measuring the position variations of the end-effector while moving the joints by the same displacement and arranging the indexes of the devices in order of the measured position variations.

11. The method according to claim 10, further comprising:
   determining that a joint in which the position variation of the end-effector is largest is connected to a base.

12. A method for estimating a connection order of modules of a modular robot, each module including a joint, a link connected to the joint and a device for controlling the joint, the method comprising:
by one or more processing devices:
measuring acceleration variations of the devices respectively provided in the modules while sequentially moving the joints respectively provided in the modules;
arranging indexes of the devices in the order of measured acceleration variations; and
estimating the connection order of modules according to the arranged indexes of the devices.

13. The method according to claim 12, wherein the sequentially moving of the joints includes:
selecting and moving one of the plurality of joints; and
enabling joints other than the moving joint to remain stationary.

14. The method according to claim 12, wherein the measuring of the acceleration variations includes:
selecting and moving one of the joints; and
measuring the acceleration variations of the devices which vary when one joint moves.

15. The method according to claim 14, wherein the arranging of the indexes of the devices includes:
measuring the acceleration variations of the devices while the joints move by the same displacement and arranging the indexes of the devices in the order of measured acceleration variations.

16. The method according to claim 15, further comprising:
determining that a joint having a largest acceleration variation is connected to a base.

17. A method for estimating a connection order of modules of a modular robot, each module including a joint, a link connected to the joint and a device for controlling the joint, comprising:
by one or more processing devices:
measuring torques applied to the joints while sequentially moving the joints respectively provided in the modules and primarily estimating the connection order of the modules;
measuring position variations of end-effectors while sequentially moving the joints and secondarily estimating the connection order of the modules;
measuring acceleration variations of the devices respectively provided in the modules while sequentially moving the joints and thirdly estimating the connection order of the modules;
computing relative distances between the joints using the primarily, secondarily and thirdly estimated connection orders; and
averaging the computed relative distances between the joints and rearranging the connection order of the modules based on the averaging.

* * * * *